Feb. 16, 1937.  G. L. COURSEN  2,071,061
ADJUSTABLE LENS MOUNT FOR CAMERAS
Filed Nov. 23, 1935  3 Sheets-Sheet 1
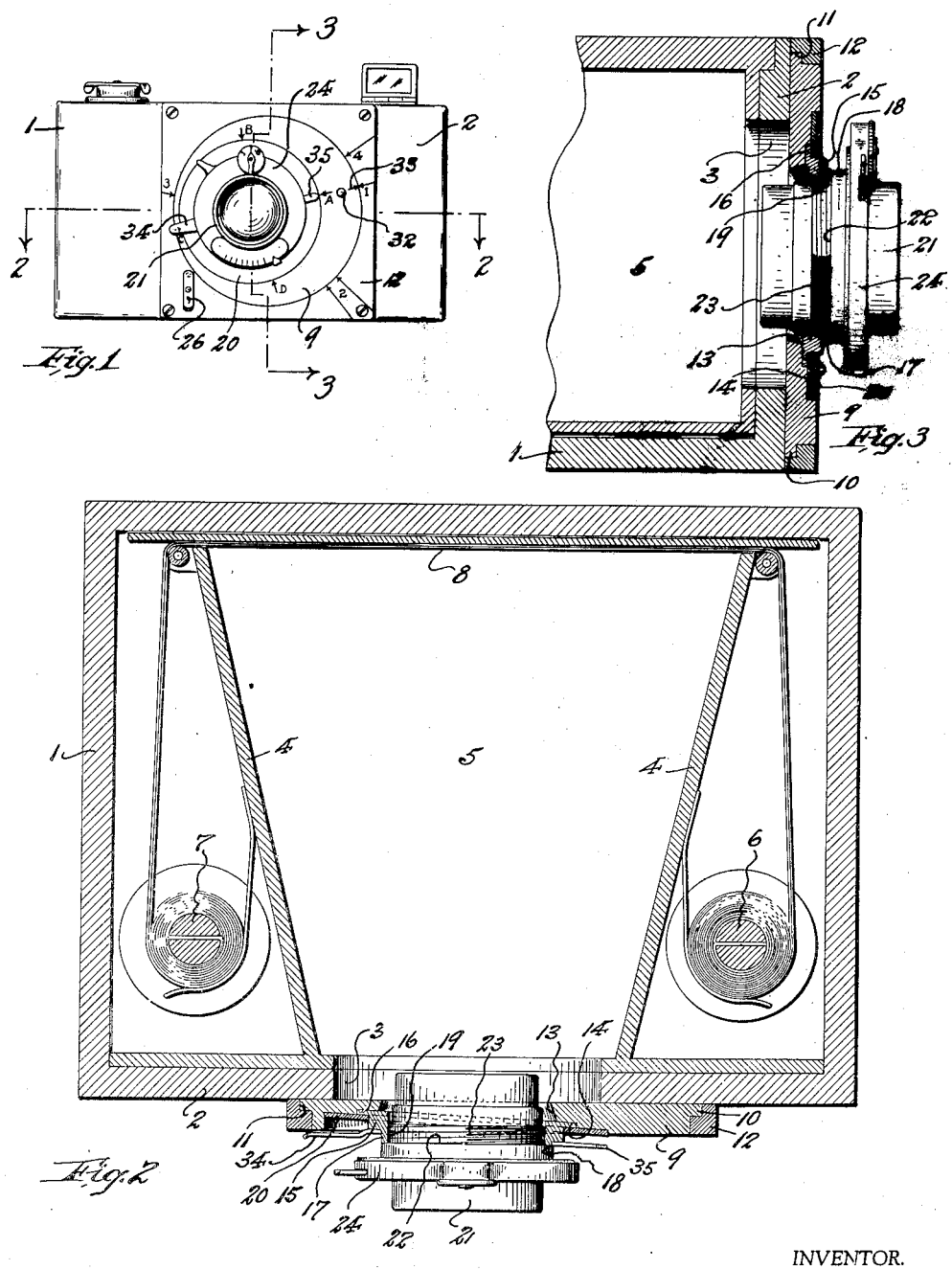
INVENTOR.
George L. Coursen,
BY
George D. Richards
ATTORNEY.

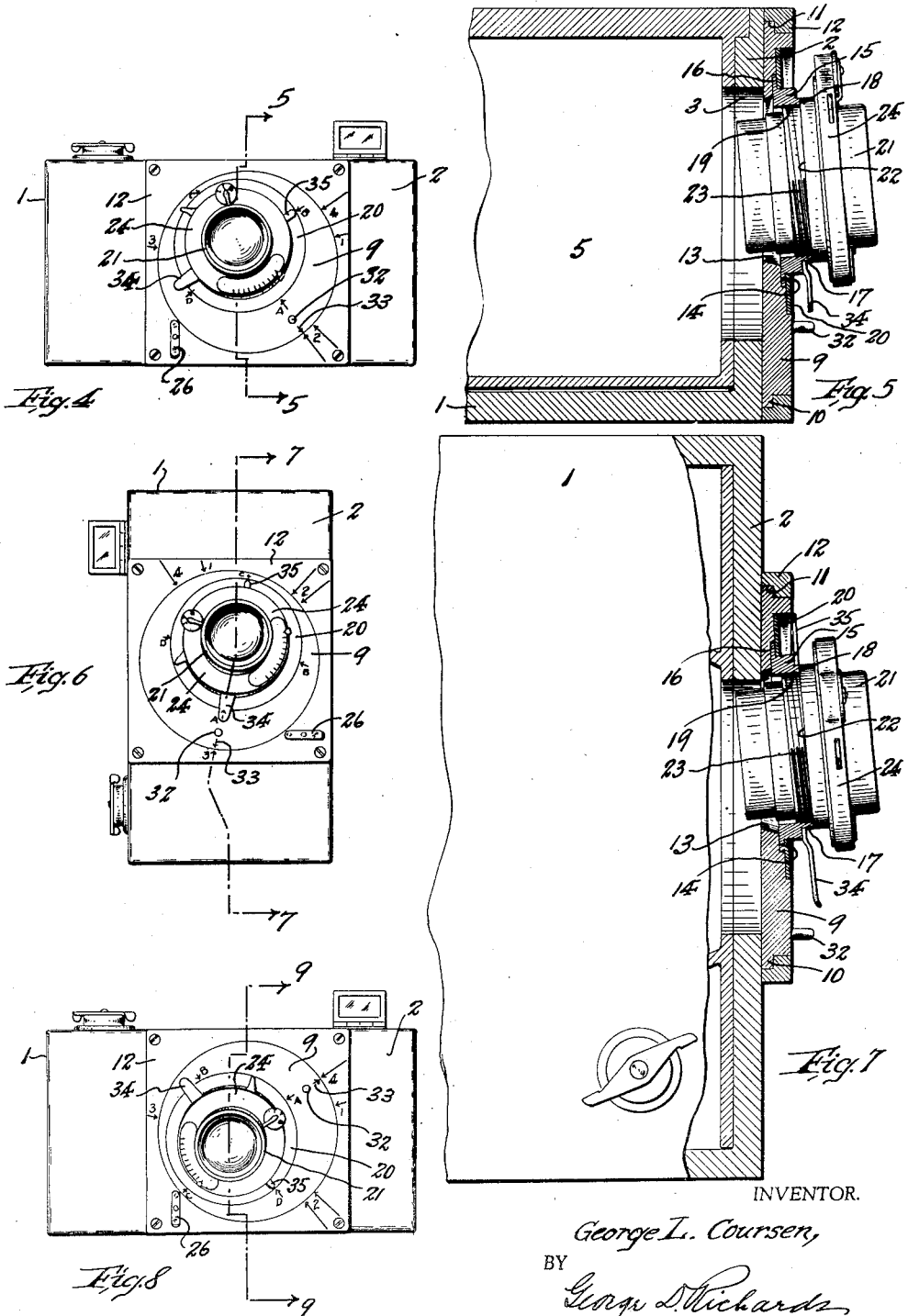

Feb. 16, 1937.  G. L. COURSEN  2,071,061
ADJUSTABLE LENS MOUNT FOR CAMERAS
Filed Nov. 23, 1935  3 Sheets—Sheet 3

INVENTOR
George L. Coursen,
BY
George D. Richards
ATTORNEY

Patented Feb. 16, 1937

2,071,061

UNITED STATES PATENT OFFICE 2,071,061

ADJUSTABLE LENS MOUNT FOR CAMERAS

George L. Coursen, East Orange, N. J.

Application November 23, 1935, Serial No. 51,236

10 Claims. (Cl. 95—50)

This invention relates generally to improvements in photographic cameras; and the invention has reference, more particularly, to a novel adjustable lens mounting whereby the camera lens may be quickly and easily disposed in positions best adapted to focus upon film or plate areas to be exposed, and in angular adjustment best adapted to comprehend the subject desired to be photographed without necessity of disturbing the true perpendicular plane of the film or plate to be exposed.

This invention has for its principal object to provide a novel adjustable camera lens support capable of quick and easy manipulation for disposing the lens at will more especially in either straight, up-tilted or down-tilted relation to the normal perpendicular plane of the film or plate to be exposed, and also in laterally angular positions if desired.

Other objects of this invention, not at this time more particularly enumerated, will be understood from the following detailed description of the same.

An illustrative embodiment of this invention is shown in the accompanying drawings, in which:—

Fig. 1 is a front end elevation of a camera of the box-type as horizontally presented, the camera being equipped with the novel adjustable lens mounting according to this invention, the lens mounting being shown as adjusted to dispose the lens in a straight disposition normal to the perpendicular plane of the film or plate to be exposed; Fig. 2 is a horizontal sectional view on an enlarged scale, taken on line 2—2 in Fig. 1; and Fig. 3 is a fragmentary vertical sectional view on an enlarged scale, taken on line 3—3 in Fig. 1.

Fig. 4 is a front end elevation of the camera as horizontally presented, with the novel lens mounting adjusted to dispose the lens in up-tilted angular relation to the perpendicular plane of the film or plate to be exposed along its thin horizontal dimension; and Fig. 5 is a fragmentary vertical sectional view on an enlarged scale, taken on line 5—5 in Fig. 4.

Fig. 6 is a front end elevation of the camera as vertically presented, with the novel lens mounting adjusted to dispose the lens in up-tilted angular relation to the perpendicular plane of the film or plate to be exposed along its thin vertical dimension; and Fig. 7 is a fragmentary vertical sectional view on an enlarged scale, taken on line 7—7 in Fig. 6.

Fig. 8 is a front end elevation of the camera as horizontally presented with the novel lens mounting adjusted to dispose the lens in down-tilted angular relation to the perpendicular plane of the film or plate to be exposed along its thin horizontal dimension.

Similar characters of reference are employed in the above described views to indicate corresponding parts.

Figure 9:
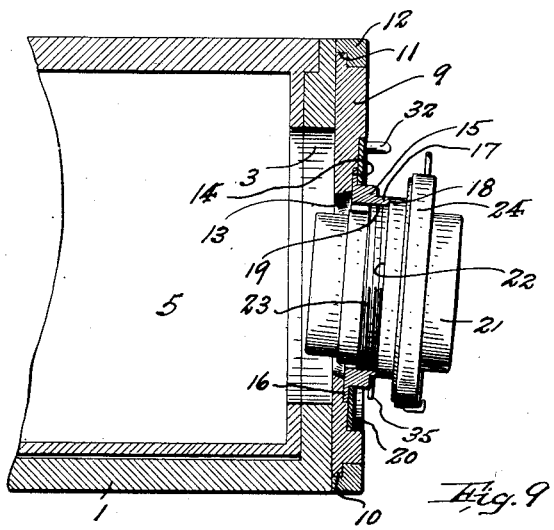
Fig. 9 is a fragmentary vertical sectional view on an enlarged scale, taken on line 9—9 in Fig. 8.
Figure 10:
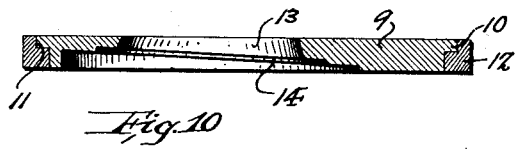
Fig. 10 is a detail sectional view of the turntable element of the adjustable lens mounting.
Figure 11:
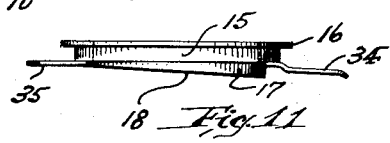
Fig. 11 is a side elevation of the lens housing carrier ring of the adjustable lens mounting.

In the drawings, the novel adjustable lens mounting is shown, for the purpose of illustration, in connection with a camera of the box-type, but it will be obvious that the same may be equally well employed in cameras of the bellows type, or in connection with cameras of any other kind or type of body design.

Referring to the drawings, the reference character 1 indicates the body of a camera, the same having a front wall 2 with a light admission opening 3 formed therein. Arranged in any suitable manner within the body interior are partitions 4 defining an exposure chamber 5, across the back of which is run, from spool 6 to spool 7, the photographic film 8 to be exposed. Said film, as disposed for exposure, is supported in a perpendicular plane at right angles to the longitudinal axis of the camera body. Although the camera is thus shown equipped to operate with film, it will be understood that such showing is also merely for the purposes of illustration, since the rear end of the camera body may be equipped to receive plate-holders, if the camera, with the features of my instant invention incorporated, is desired to be of the plate rather than the film type.

Connected with the front wall 2 of the camera body, so as to be disposed over the opening 3 thereof is a circular turn-table 9 rotatable in a plane parallel to said front wall and its opening. Said turn-table 9 is provided with a peripheral male rabbet piece 10 adapted to fit an annular female rabbet groove 11 provided in a supporting or bearing portion 12 which is arranged in connection with said front wall 2, either as an integral part thereof or affixed thereto, in surrounding relation to the turn-table. Formed in said turn-table 9 is an eccentrically located opening 13. Provided at the outwardly presented face of the turn-table 9 around and concentric to the margins of its opening 13 is an annular way or seat means 14 disposed in an inclined plane angular to the plane of the camera front wall 2 and to the corresponding normal perpendicular transverse plane of the film or plate disposed for exposure at the back of the camera exposure chamber 5.

The reference character 15 indicates a lens housing carrier ring, having at its inner end an annular bearing flange 16. Provided at the outer extremity of carrier ring 15 is a seating shoulder 17, the outer abutment face 18 of which is disposed in an inclined plane angular to the plane of said bearing flange 16 of carrier ring 15. Carrier ring 16 is provided with an internally threaded bore 19, the axis of which is disposed at right angles to the inclined plane formed by outer abutment face 18 of said carrier ring.

The carrier ring 15 is rotatably mounted on said turn-table 9, the bearing flange 16 of the former being rotatively slidable in and upon the inclined way or seat means 14 of the latter. The degree of inclination of the plane of abutment face 18 relative to the plane of bearing flange 16 of the carrier ring 15 is the same as the degree of inclination of the plane of way or seat means 14 of said turn-table 9. Carrier ring 15 is retained in assembled relation to turn-table 9 by means of a keeper ring 20 which is secured to turn-table 9 so as to overlap the bearing flange 16 of carrier ring, when said bearing flange is rotatively lodged in the way or seat 14 of turn-table 9.

The reference character 21 indicates a lens holder or housing, having a shoulder portion 22 to seat or abut upon abutment face 18 of carrier ring seating shoulder 17, and the same being further provided, inwardly of said shoulder portion 22, with an externally screw-threaded portion 23 to screw into the bore of carrier ring 15, thus operatively assembling said lens housing with the latter. As shown, lens housing 21 is provided with a shutter enclosing portion 24, this may be omitted, however, when the lens is covered and uncovered by means of a manipulatable cap removably engageable with the outer end of lens housing 21 as is preferable in some types of cameras, such e. g. as portrait cameras.

Figure 12:
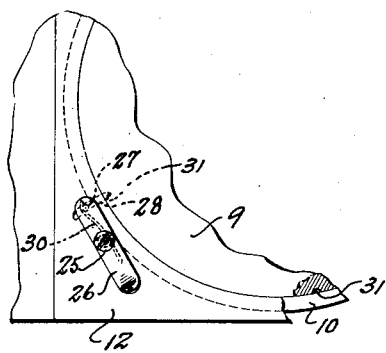
Fig. 12 is an enlarged fragmentary face view and part section of the turn-table element of the novel lens mounting, showing, in elevation, releasable means for holding the same in a desired adjusted position.
Figure 13:
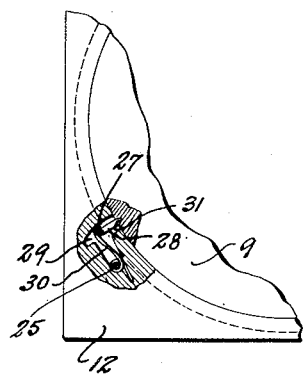
Fig. 13 is a similar view with parts in section to expose otherwise concealed parts.

Means are provided for releasably locking turn-table 9 in various adjusted positions. Illustrative of one form of means suitable for such purpose reference may be had, more particularly, to Figs. 12 and 13 of the drawings. Pivoted by a fulcrum screw 25 on the turn-table supporting or bearing portion 12 is a lever-piece 26, having an arm 27 dependent from its under side, said arm terminating in a lateral latch tongue 28 which projects toward the adjacent peripheral portion of said turn-table 9. These parts are housed in a cutaway portion or chamber 29 formed in portion 12, said chamber being suitably shaped to accommodate operative movements of arm 27 and latch tongue 28. Spring means 30 yieldably swings the lower piece 26 to urge arm 27 and latch tongue 28 toward turn-table 9. Formed in the periphery of turn-table 9, at suitable locations calculated to locate the latter in the various desired positions to which it may b rotatively adjusted, are sockets 31 engageable by the free end of said latch tongue 28.

Said turn-table 9 is provided with an outwardly projecting finger-piece 32 which may be grasped and utilized to impart rotative adjusting movement to said turn-table; and said turn-table is also provided with a register or indicator mark 33 alignable with various fixed station marks inscribed on the turn-table bearing or supporting portion 12, said marks being respectively designated by the numerals "1", "2", "3" and "4".

Lens housing carrier ring 15 is also provided with a radially projecting handle element 34 for rotatively adjusting the same relative to turn-table 9; and said carrier ring 15 is further provided with an indicator or pointer element 35 alignable with various fixed station marks inscribed on the face of said turn-table 9, said marks being respectively designated by the letters "A", "B", "C" and "D".

The specific arrangement of turn-table position stations and carrier ring position stations above described, may be more or less altered in arrangement, and more or less stations may be provided as may be expedient in any given case. The illustrated arrangement or one substantially equivalent thereto is deemed the most desirable for general purpose cameras and for amateurs, but more elaborate arrangements may be provided in cameras for professional use when desired.

In the use of a camera it is quite essential that, when exposure of the film or plate takes place, the film or plate shall be disposed in a true perpendicular plane so that vertical and horizontal lines of the subject photographed will be reproduced on the film or plate in corresponding vertical and horizontal disposition so as to avoid distortion, loss of proper perspective, etc. In cameras equipped with the instant adjustable lens mounting invention, the true perpendicular plane of the film may be assured, and yet high lying or low lying subjects may be adequately covered by angularly adjusting the lens relative to the desired perpendicular plane of the film or plate, without risk of distortion of the photographic image, while at the same time the desired symmetrical positioning of such image within the area of the film or plate is facilitated.

In explanation of the use and advantages of the novel adjustable lens mounting of this invention, let it be assured that a normal disposition of the lens axis at right angles to the perpendicular plane of the film or plate is desired to be utilized, as e. g. when taking photographs of more or less nearby subjects or those the elements of which have no great contrasts of height or depth. In such case the turn-table 9 is rotated to a position wherein its register or indicator mark 33 is opposed to position station mark "1" (see Fig. 1). Such adjustment of turn-table 9 disposes the inclined way or seat 14 with its low side to the left and its high side to the right. With the turn-table 9 in this position, lens housing carrier ring 15 is rotatively adjusted to bring its pointer element 35 into registration with position station mark "A" (see Fig. 1), in which position it is retained by friction or otherwise as may be expedient. Such adjustment of carrier ring 15 disposes the inclined abutment face 18 with its high side to the left and its low side to the right, thus registering its high side with the low side of the inclined way or seat 14 of turn-table 9 and its low side with the high side of the latter. Since the degree of inclination of abutment face 18 is substantially the same as that of the inclination of turn-table way or seat 14, it follows that, when relatively disposed in the positions above mentioned, the one will offset the other, and consequently the lens will be disposed in a transverse plane parallel to the perpendicular plane of the film or plate and with its focal axis at right angles to the latter. In other words, the disposition of the lens under such circumstances is normal or straight (see Figs. 2 and 3). When the lens is so adjusted the camera may be used in either a position wherein the major dimension or length of the film or plate is horizontal or wherein such dimension or length is vertical.

Assuming now that it is desired to photograph a subject having high lying elements or elements of considerable height, such e. g. as street scenes with tall buildings, high mountains or high land elevations, etc., in such the lens may be positioned in an up-tilted focal angle relative to the perpendicular plane of the plate or film. If it is desired to expose the film or plate in such case in a position wherein its major dimension or length is horizontal, which is done by using the camera in horizontal position, then the turn-table 9 is rotatively adjusted to dispose the same with its register or indicator mark 33 opposed to position station mark "2" (see Fig. 4). Such adjustment disposes the inclined way or seat 14 with its low side upward and its high side downward. With the turn-table 9 in this position, lens housing carrier ring 15 is rotatively adjusted to bring its pointer element 35 into registration with position station mark "B" (see Fig. 4). Such adjustment of the carrier ring disposes the inclined abutment face 18 with its low side upward and its high side downward, thus bringing the low side thereof into register with the raised low side of seat or way 14, and its high side into register with the lowered high side of the latter, and consequently the focal axis of the lens will be up-tilted or inclined at an upward angle relative to the perpendicular plane of the film or plate (see Fig. 5). Owing to the fact that the opening of turn-table 9, through which the lens is exposed, is eccentric to the turn-table circumference, the shifting of the turn-table to the position last described tends to elevate or lift the up-tilted lens bodily somewhat toward the top of the camera as horizontally disposed. This tends to compensate or offset the inward depression of the inclined focal axis of the lens so as to more or less centrally dispose its termination at the surface area of the film or plate. When the lens is up-tilted in the manner described, the high elements of the subject being photographed are adequately comprehended and the image thereof transferred to the film or plate without risk of distortion, and without disturbance in the image of vertical and horizontal lines included in the subject. If it is desired to use the camera with the lens up-tilted as above described so as to expose the film or plate with its major dimension or length vertically disposed, which is done by using the camera in vertical position, then turn-table 9 is rotatively adjusted to dispose the same with its register or indicator mark 33 opposed to position station mark "3", while carrier ring 15 is rotatively adjusted to dispose pointer element 35 opposite position station mark "C" (see Fig. 6). By such adjustments the registered low sides of inclined seat or way 14 and inclined abutment face 18 are positioned toward the top of the camera as vertically presented, and consequently the same up-tilted disposition of the lens is assured, while at the same time the bodily elevation of the lens relative to such camera position is likewise attained, and consequently the camera may be used in vertical position to the same advantage as already explained in connection with its use, with up-tilted lens, in horizontal position (see Fig. 7).

Assuming now that it is desired to photograph a subject having low lying elements or elements of considerable depth, such e. g. as street or other scenes taken from a point of relatively high elevation; in such case the lens may be positioned in a down-tilted focal angle relative to the perpendicular plane of the plate or film. If it is desired to expose the film or plate in such case in a position wherein its long dimension is horizontal, which is done by using the camera in horizontal position, then the turn-table 9 is rotatively adjusted to dispose the same with its register or indicator mark 33 opposed to position station mark "4" (see Fig. 8). Such adjustment disposes the inclined way or seat 14 with its low side downward and its high side upward. With the turn-table in this position, lens housing carrier ring 15 is rotatively adjusted to bring its pointer element 35 into registration with position station mark "D" (see Fig. 8). Such adjustment of carrier ring 15 disposes the inclined abutment face 18 with its low side downward and its high side upward, thus bringing the low side thereof into register with the lowered low side of seat or way 14 and its high side into register with the raised high side of the latter, and consequently the focal axis of the lens will be down-tilted or inclined at a downward angle relative to the perpendicular plane of the film or plate (see Fig. 9). In rotatively adjusting turn-table 9 to the stated position, its eccentrically located opening through which the lens is exposed, will be downwardly moved toward the bottom of the camera as horizontally disposed. This tends to compensate or offset the inward elevation of the inclined focal axis of the lens so as to more or less centrally dispose its termination at the surface area of the film or plate. When the lens is down-tilted, in the manner described, the low lying elements of the subject being photographed are also adequately comprehended and the image thereof transferred to the film or plate without risk of distortion, and without disturbance in the image of vertical and horizontal lens included in the subject.

From the above described manipulated lens adjustments attainable by the use of the instant invention, it will be apparent that said invention provides a very simple and yet highly efficient means for modifying the camera to accommodate the various relative dispositions and characters of subjects desired to be photographed. The novel arrangement is such that cumbersome tiltable camera backs and similar adjuncts, which are difficult both of precise and rapid manipulation, are rendered entirely unnecessary, and an easily and quickly manipulatable adjustable lens mounting is provided, whereby better photographic results are assured in the hands of either amateurs or professionals, and possibility of error in camera adjustment for accommodating given conditions is reduced to a minimum.

It may here be pointed out that the principles of lens adjustment involved and provided for by the instant invention also may be utilized for concentrating an image upon a selected portion of a film or plate surface to either the right or left, or in an upper or lower zone, whereby, as is sometimes desirable in portrait work, several exposures may be made on different selected sectional areas of a single plate. In such use, the dividing partitions or masks, as the case may be, with which professional photographers are familiar, may be employed so as to shut off the projected image transferring light from all areas of the film except that upon which the adjusted lens is focused in any given case or operation. In some cases the turn-table alone may be used with the lens eccentrically positioned thereon so as to merely shift the focal axis of the lens relative to various sectional areas of the plate or film without accompanying tilting or angular inclination of said focal axis.

I am aware that many changes could be made in the above described constructions and many apparently widely different embodiments of this invention could be made without departing from the scope thereof as defined in the following claims. It is therefore intended that all matter contained in the above description or shown in the accompanying drawings shall be interpreted as illustrative and not in a limiting sense.

I claim:—

1. An adjustable lens for cameras, comprising a transverse support at the camera front having an opening therethrough, an annular seating way around said opening disposed in an inclined flat transverse plane angular to the plane of said support, a lens carrier having an annular flange rotatively supported on said seating way, said carrier having means to support a lens in a transverse plane angular to the plane of movement of said carrier on said seating way, and said carrier having a radially projecting handle lever for manipulating the same.

2. An adjustable lens mount for cameras, comprising a rotatively adjustable turn-table at the camera front, said turn-table having an eccentrically positioned opening through which the camera lens is exposed, an annular seating way about said opening disposed in a transversely inclined plane, a lens means carrier ring supported by said inclined seating way for rotative adjustment thereon, and said carrier ring having a transversely inclined abutment face to position the lens means so that the focal axis thereof is inclined relative to the central axis of said carrier ring.

3. An adjustable lens mount for cameras, comprising a rotatively adjustable turn-table at the camera front movable in a plane parallel to the plane of a film or plate positioned for exposure within the camera, said turn-table having an eccentrically disposed opening through which the camera lens is exposed, an annular seating way about said opening disposed in an inclined transverse plane angular to the plane of said turn-table, a lens means carrier supported by said seating way for rotative adjustment on said turn-table, and said carrier having means to support the lens in a transverse plane angular to the plane of movement of said carrier on said turn-table.

4. An adjustable lens mount for cameras, comprising a rotatively adjustable turn-table at the camera front movable in a plane parallel to the plane of a film or plate positioned for exposure within the camera, said turn-table having an eccentrically disposed opening through which the camera lens is exposed, an annular seating way about said opening disposed in an inclined transverse plane angular to the plane of said turn-table, a lens means carrier supported by said seating way for rotative adjustment on said turn-table, and said carrier having means to support the lens in a transverse plane angular to the plane of movement of said carrier on said turn-table, and means to lock said turn-table in various adjusted positions.

5. An adjustable lens mount for cameras, comprising a rotatively adjustable turn-table at the camera front movable in a plane parallel to the plane of a film or plate positioned for exposure within the camera, said turn-table having an eccentrically disposed opening through which the camera lens is exposed, an annular seating way about said opening disposed in an inclined transverse plane angular to the plane of said turn-table, a lens means carrier supported by said seating way for rotative adjustment on said turn-table, and said carrier having means to support the lens in a transverse plane angular to the plane of movement of said carrier on said turn-table, means to indicate various position stations of adjustment to which said turn-table may be moved, and means to indicate various position stations of adjustment to which said carrier may be moved on said turn-table.

6. An adjustable lens mount for cameras, comprising a rotatively adjustable turn-table at the camera front movable in a plane parallel to the plane of a film or plate positioned for exposure within the camera, said turn-table having an eccentrically disposed opening through which the camera lens is exposed, an annular seating way about said opening disposed in an inclined transverse plane angular to the plane of said turn-table, a lens means carrier supported by said seating way for rotative adjustment on said turn-table, and said carrier having means to support the lens in a transverse plane angular to the plane of movement of said carrier on said turn-table, means to indicate various position stations of adjustment to which said turn-table may be moved, and means to indicate various position stations of adjustment to which said carrier may be moved on said turn-table, and means to selectively lock said turn-table in its various adjusted positions.

7. An adjustable lens mount for cameras, comprising a rotatively adjustable turn-table at the camera front movable in a transverse perpendicular plane parallel to the like plane of a film or plate disposed within the camera for exposure, a lens carrier, means to support said lens carrier for rotative adjustment in a transverse plane angular to the perpendicular plane of said turn-table, said lens carrier being thus supported in a position eccentric to the axis of rotation of said turn-table and means to affix a lens to said carrier in a transverse plane angular to the plane of rotative movement of said carrier, the angular plane of rotative movement of said carrier and the angular plane of lens disposition relative to said carrier being of substantially the same degree, whereby rotative adjustment of the carrier operates to selectively position the focal axis of the lens at either a right angle to the perpendicular plane of a film or plate disposed within the camera for exposure or at angles inclined from such right angle in any desired direction, and whereby rotative adjustment of said turn-table either centers or offsets the lens for correspondence to the straight or inclined disposition of its focal axis.

8. An adjustable lens mount for cameras, comprising a rotatively adjustable turn-table at the camera front movable in a transverse perpendicular plane parallel to the like plane of a film or plate disposed within the camera for exposure, a lens carrier, means to support said lens carrier for rotative adjustment in a transverse plane angular to the perpendicular plane of said turntable, said lens carrier being thus supported in a position eccentric to the axis of rotation of said turn-table, and means to affix a lens to said carrier in a transverse plane angular to the plane of rotative movement of said carrier, the angular plane of rotative movement of said carrier and the angular plane of lens disposition relative to said carrier being of substantially the same degree, whereby rotative adjustment of the carrier operates to selectively position the focal axis of the lens at either a right angle to the perpendicular plane of a film or plate disposed within the camera for exposure or at angles inclined from such right angle in any desired direction, and whereby rotative adjustment of said turntable either centers or offsets the lens for correspondence to the straight or inclined disposition of its focal axis, and means to lock said turntable in various adjusted positions.

9. In an adjustable lens mount for cameras as defined in claim 7, means to indicate various position stations of adjustment to which said turn-table may be moved, and means to indicate various position stations of adjustment to which said carrier may be moved on said turn-table.

10. In an adjustable lens mount for cameras as defined in claim 7, means to indicate various position stations of adjustment to which said turn-table may be moved, means to indicate various position stations of adjustment to which said carrier may be moved on said turn-table, and means to releasably and selectively lock said turntable in its various adjusted positions.

GEORGE L. COURSEN.